United States Patent
Ito et al.

(10) Patent No.: US 8,340,821 B2
(45) Date of Patent: Dec. 25, 2012

(54) ROBOT PROGRAM ADJUSTING SYSTEM

(75) Inventors: Takayuki Ito, Yamanashi (JP);
Yoshiharu Nagatsuka, Yamanashi (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 821 days.

(21) Appl. No.: 12/175,569

(22) Filed: Jul. 18, 2008

(65) Prior Publication Data
US 2009/0043425 A1 Feb. 12, 2009

(30) Foreign Application Priority Data
Aug. 10, 2007 (JP) ................................. 2007-209913

(51) Int. Cl.
*G05B 19/18* (2006.01)

(52) U.S. Cl. ........ 700/256; 700/245; 700/250; 700/258; 700/260; 700/261; 901/2; 901/10; 901/14; 901/15

(58) Field of Classification Search ........................ None
See application file for complete search history.

(56) References Cited

U.S. PATENT DOCUMENTS

| | | | | |
|---|---|---|---|---|
| 4,819,184 A | * | 4/1989 | Jonsson et al. ................ | 700/261 |
| 4,828,451 A | * | 5/1989 | Mikoshi et al. ................ | 414/680 |
| 4,873,476 A | * | 10/1989 | Kurakake et al. ........ | 318/568.22 |
| 4,970,448 A | * | 11/1990 | Torii et al. .................. | 318/568.1 |
| 5,130,632 A | * | 7/1992 | Ezawa et al. ............. | 318/568.11 |
| 5,550,577 A | * | 8/1996 | Verbiest et al. ................. | 725/92 |
| 5,562,843 A | * | 10/1996 | Yasumoto ................ | 219/124.34 |
| 5,659,779 A | * | 8/1997 | Laird et al. .................... | 709/226 |
| 5,764,731 A | * | 6/1998 | Yablon ....................... | 379/88.15 |
| 6,230,079 B1 | * | 5/2001 | Brogårdh et al. ............. | 700/260 |
| 6,292,713 B1 | * | 9/2001 | Jouppi et al. ................... | 700/245 |
| 6,343,243 B1 | * | 1/2002 | Brogårdh et al. ............. | 700/258 |
| 6,346,950 B1 | * | 2/2002 | Jouppi .......................... | 345/660 |
| 6,604,021 B2 | * | 8/2003 | Imai et al. ..................... | 700/245 |
| 7,710,415 B2 | * | 5/2010 | Jennings et al. .............. | 345/420 |
| 2001/0037163 A1 | * | 11/2001 | Allard ........................... | 700/245 |
| 2002/0057279 A1 | * | 5/2002 | Jouppi ........................... | 345/619 |
| 2002/0063726 A1 | * | 5/2002 | Jouppi ........................... | 345/660 |

(Continued)

FOREIGN PATENT DOCUMENTS

EP 1 584 999 10/2005

(Continued)

OTHER PUBLICATIONS

Japanese Notice of Reasons for Rejection mailed Nov. 4, 2008 in JP Application No. 2007-209913.
European Search Report mailed Mar. 5, 2010 issued in EP Application No. 08012236.9.

*Primary Examiner* — Dalena Tran
*Assistant Examiner* — Jonathan L Sample
(74) *Attorney, Agent, or Firm* — Drinker Biddle & Reath LLP (57) ABSTRACT

A robot program adjusting system (11) adjusting an operating program of a robot arm having a plurality of axes including an overload identifying means (12) for successively reading operational instructions from said operating program of said robot arm to run simulations and thereby identify an axis where overload is acting from said plurality of axes, an additional operation generating means (13) for generating an additional operation for an axis other than the axis identified by said overload identifying means (12) to lighten the load of said identified axis, and a program adjusting means (15) for adjusting the operating program of said robot arm based on the additional operation generated by said additional operation generating means (13), whereby the load acting on an axis with a large load can be lightened without trial and error.

9 Claims, 9 Drawing Sheets

U.S. PATENT DOCUMENTS

| | | | |
|---|---|---|---|
| 2005/0125098 A1* | 6/2005 | Wang et al. | 700/245 |
| 2005/0179416 A1* | 8/2005 | Iribe et al. | 318/563 |
| 2005/0224479 A1* | 10/2005 | Watanabe et al. | 219/125.1 |
| 2006/0071625 A1* | 4/2006 | Nakata et al. | 318/568.12 |
| 2007/0021868 A1* | 1/2007 | Nagatsuka et al. | 700/245 |
| 2007/0050091 A1* | 3/2007 | Nagatsuka et al. | 700/259 |
| 2007/0265731 A1* | 11/2007 | Merk et al. | 700/245 |
| 2007/0288124 A1* | 12/2007 | Nagata et al. | 700/258 |

FOREIGN PATENT DOCUMENTS

| | | |
|---|---|---|
| EP | 1 752 847 | 2/2007 |
| JP | 1-237703 | 9/1989 |
| JP | 5-261691 | 10/1993 |
| JP | 7-78014 | 3/1995 |
| JP | 2005-293332 | 10/2005 |
| JP | 2007-054942 | 3/2007 |

* cited by examiner

ROBOT PROGRAM ADJUSTING SYSTEM

RELATED APPLICATION DATA

This application claims priority under 35 U.S.C. §119 and/or §365 to Japanese Application No. 2007-209913, filed Aug. 10, 2007, the entire contents of which are incorporated herein by reference.

BACKGROUND OF THE INVENTION

1. Field of the Invention

The present invention relates to a robot program adjusting system adjusting the operating program of a robot arm having a plurality of axes.

2. Description of the Related Art

In general, a robot operating program prepared off line is almost never used on the work floor as it is, but is used after correction. This is because in the off-line world and the on-line (work floor) world, the relative positional relationship between the workpiece and robot, the posture of the robot, etc. finely differ and cause deviations.

Japanese Unexamined Patent Publication No. 2007-054942 discloses using simulation to correct an operating program during which calculating the load of each axis of the robot.

However, in Japanese Unexamined Patent Publication No. 2007-054942, even when it was possible to calculate the loads of the different axes of the robot off line, it was not possible to judge if such loads or the speeds and reduction gear lifetimes of the axes would have a detrimental effect on the robot operation. That is, since this did not consider the loads, speeds, and reduction gear lifetimes of the different axes of the robots off line, it was not possible to estimate the robot operation at a high precision and there was a limit to accurately correcting the operating program.

Furthermore, as disclosed in Japanese Unexamined Patent Publication No. 2007-054942, even when it was possible to calculate the loads of axes of the robot, trial and error were required for reducing the load for an axis with a relatively large load.

In other words, in the prior art, to lighten the load acting on an axis, it was necessary to actually operate the robot while changing the teaching points in the operating program and investigate if the load was lightened and then change the teaching points until the load was lightened. This meant tremendous time was required for constructing the robot system.

The present invention was made in consideration of this situation and has as its object the provision of a robot program adjusting system able to lighten the load for an axis with a large load without trial and error.

SUMMARY OF THE INVENTION

To achieve this object, according to a first aspect of the invention, there is provided a robot program adjusting system adjusting an operating program of a robot arm having a plurality of axes, which robot program adjusting system is provided with an overload identifying means for successively reading operational instructions from said operating program of said robot arm to run simulations and thereby identify an axis where overload is acting from said plurality of axes, an additional operation generating means for generating an additional operation for an axis other than the axis identified by said overload identifying means to lighten the load of said identified axis, and a program adjusting means for adjusting the operating program of said robot arm based on the additional operation generated by said additional operation generating means.

In other words, in a first aspect of the invention, the load of the axis identified by the overload identifying means is dispersed to axes other than that axis by the additional operation generating means. For this reason, it is possible to lighten the load of the identified axis without trial and error.

According to a second aspect of the invention, as in the first aspect of the invention, said axis other than the identified axis is positioned at a front end side of said robot arm from said identified axis.

In other words, in a second aspect of the invention, the load of the identified axis can be lightened by a relatively simple operation.

According to a third aspect of the invention, as in the first aspect of the invention, said axis other than the identified axis is positioned at the base end side of said robot arm from said identified axis.

In other words, in the third aspect of the invention, even when there is no axis at the front end side from the identified axis or the axis at the front end side from the identified axis cannot be moved, the load of the identified axis can be lightened.

According to a fourth aspect of the invention, as in any one of the first to third aspects of the invention, when two or more of said additional operations are generated, at least two of these additional operations are combined.

In other words, in the fourth aspect of the invention, it is possible to combine a plurality of additional operations to shorten the robot operating time.

According to a fifth aspect of the invention, as in the second aspect of the invention, said additional operation includes making an axis positioned at a front end side of said robot arm from said identified axis move so that the center of gravity of the workpiece gripped by a hand of said robot arm is positioned on an extension of the center of rotation or movement direction of the identified axis.

In other words, in the fifth aspect of the invention, by positioning the center of gravity of the workpiece on the extension of the center of rotation or movement direction of the identified axis, it is possible to minimize the load acting on the identified axis.

According to a sixth aspect of the invention, as in the third aspect of the invention, said additional operation includes making an axis positioned at a front end side of said robot arm from said identified axis move so that a horizontal direction distance between a center of rotation or a movement direction of an axis of a base end side of said robot arm from said identified axis and a center of gravity of a workpiece gripped by a hand of said robot arm becomes the minimum.

In other words, in the sixth aspect of the invention, the force acting on the workpiece is made not to include any horizontal direction component so as to enable the load acting on the identified axis to be minimized.

According to a seventh aspect of the invention, as in any one of the first to sixth aspects of the invention, said additional operation generating means includes an interference checking means for checking if said robot arm interferes with peripheral equipment based on the additional operation.

In other words, in the seventh aspect of the invention, interference of the robot arm with peripheral equipment can be predicted in advance and the robot program readjusted.

These objects, features, and advantages of the present invention and other objects, features, and advantages will become clearer from the following description of the preferred embodiments of the present invention shown in the attached drawings.

DETAILED DESCRIPTION

Below, embodiments of the present invention will be explained with reference to the attached drawings. In the following drawings, similar members are assigned similar reference numerals. To facilitate understanding, the scales in these figures are suitable changed.

Figure 1:
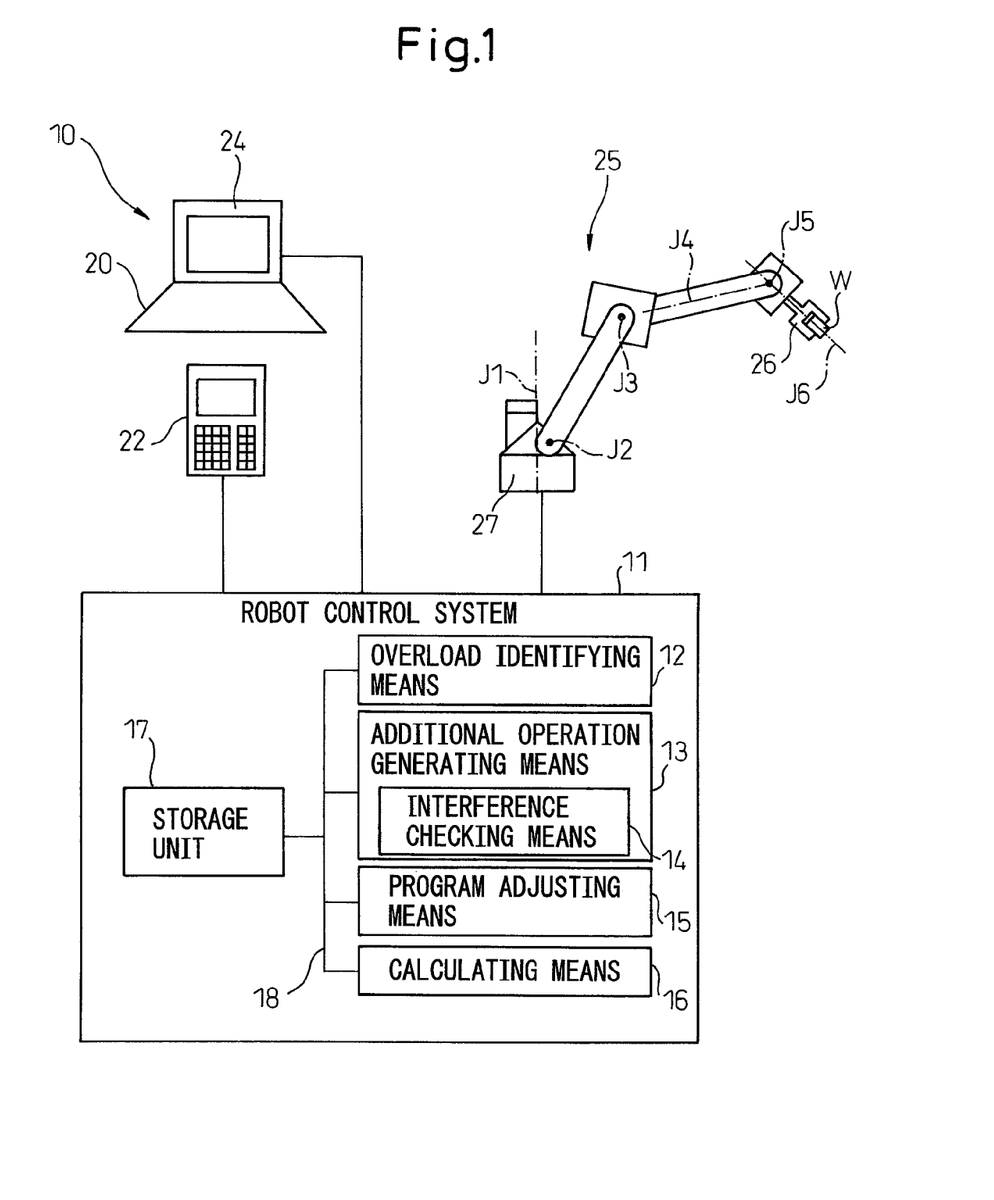
FIG. 1 is a view showing the basic configuration of a robot system including a robot program adjusting system based on the present invention.

FIG. 1 is a conceptual view of a robot program adjusting system according to the present invention. As shown in FIG. 1, the robot system 10 includes a handling robot 25 provided with a hand 26 for gripping a worked object, that is, a workpiece W. As illustrated, the handling robot 25 (below, robot 25) is a multiarticulated robot arm with six degrees of freedom and has six axes J1 to J6. As can be seen from FIG. 1, these axes J1 to J6 are arranged in order from a base 27 of the robot 25 to the hand 26, that is, from a base end to a front end of the robot 25.

Furthermore, the robot system 10 includes a robot control system 11 for controlling the handling robot 25, a personal computer or other input device 20 connected to the robot control system 11, an LCD display or other display means 24, and a teaching operation panel 22 connected to the robot control system 11 for a teaching operation of the robot 25.

The robot control system 11 is a digital computer and includes an overload identifying means 12 for identifying an axis to which overload is applied among the six axes J1 to J6, an additional operation generating means 13 for generating an additional operation for an axis other than the axis identified by the overload identifying means 12 for lightening the load on the identified axis, and a program adjusting means 15 for adjusting an operating program of the robot arm based on an additional operation generated by the additional operation generating means 13.

Furthermore, as shown in FIG. 1, the additional operation generating means 13 includes an interference checking means 14 for checking whether the robot arm would interfere with peripheral equipment under the new operating program including the additional operation. Further, the robot control system 11 includes a calculating means 16 for calculating a load torque and speed at each axis J1 to J6 of the robot and the lifetime of a reduction gear (not shown) provided at each axis.

Further, as illustrated, the robot control system 11 includes a storage unit 17 storing the operating program and various types of data of the robot 25. Further, the overload identifying means 12, additional operation generating means 13, program adjusting means 15, calculating means 16, and storage unit 17 are connected by a bidirectional bus 18 with each other.

Figure 2:
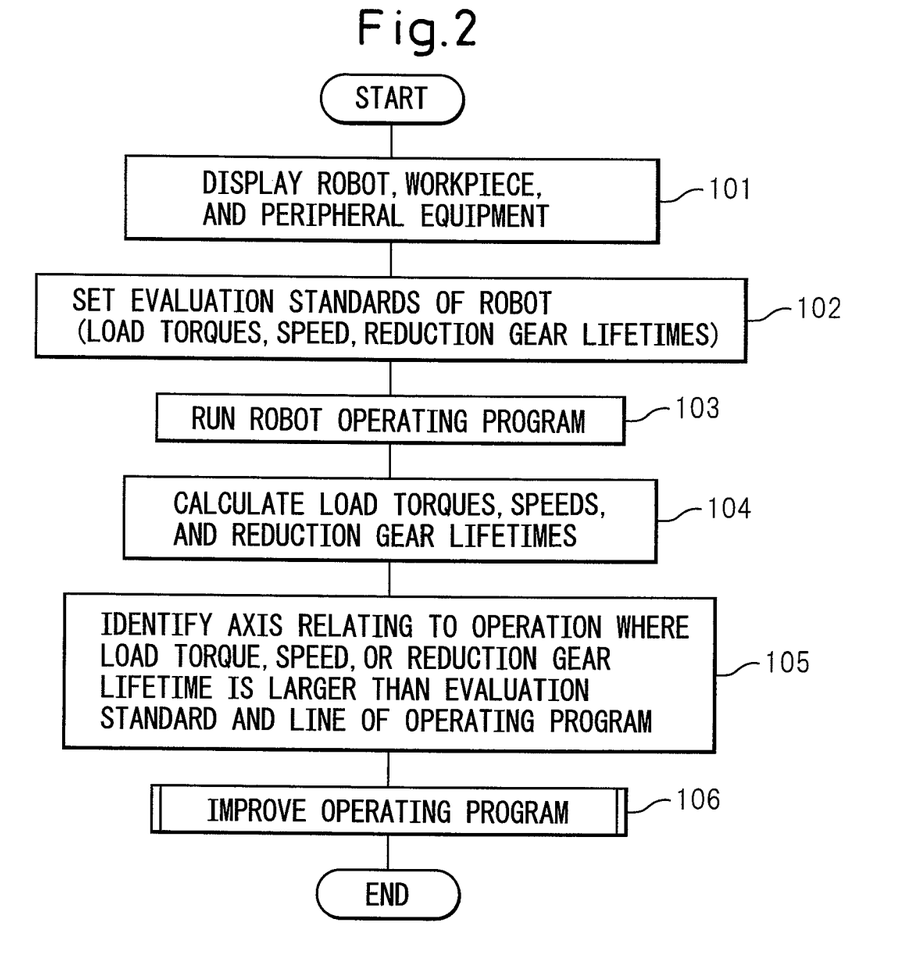
FIG. 2 is a flowchart showing a work flow by the robot program adjusting system.

FIG. 2 is a flowchart showing the work flow by the robot program adjusting system based on the present invention. Below, the program adjusting system based on the present invention will be explained with reference to FIG. 2. First, at step 101 of FIG. 2, a 3D model of the robot 25, workpiece W, and peripheral equipment (not shown in figure) is displayed on the display means 24.

Then, at step 102, the evaluation standards of the robot 25 are set. The evaluation standards of the robot 25 are the load torques and speeds of the axes J1 to J6 and the lifetimes of the reduction gears provided at the axes. The operator uses the input device 20 shown in FIG. 1 to set these evaluation standards.

Figure 3:
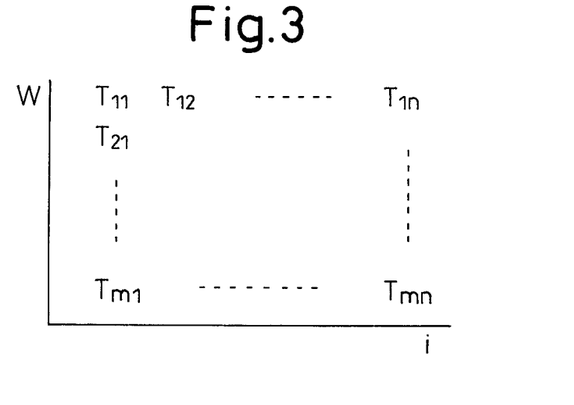
FIG. 3 is a view showing a map of the torque.

Alternatively, the evaluation standards (load torques, speeds, and reduction gear lifetimes) may for example be selected from maps found in advance as functions of the axis no. i of the robot and type of the workpiece W etc. For reference, a map of the evaluation standard of the load torque T is shown in FIG. 3. Note that maps of the speeds and reduction gear lifetimes of the axes are not shown, but are similar.

Further, the evaluation standards need only be set for one of the load torques, speeds, and reduction gear lifetimes. However, when setting all of the load torques, speeds, and reduction gear lifetimes, it is possible to estimate the operation of the robot with a higher precision needless to say.

Then, at step 103, the operating program of the robot 25 is read from the storage unit 17 and a simulation is run on the display means 24. Due to this, the positions and torques (Newton Euler torques) of the axes J1 to J6 are calculated for each unit time.

Then, at step 104, the load torques and speeds of the axes J1 to J6 and the lifetimes of the reduction gears (not shown) at the axes J1 to J6 are calculated. First, the load torques of the axes J1 to J6, strictly speaking the load torques of the servo motors, are calculated by the following equation (1) from the relationship between the position of the axes J1 to J6 and time at the simulation results.

$$\text{Load torque} = \text{Newton Euler torque} + \text{frictional force} + \text{rotor inertia drive force} \quad (1)$$

Here, the frictional force and rotor inertia drive force are predetermined values depending on the robot 25 and servo motor. These predetermined values are stored in advance in the storage unit 17. The load torques of the servo motors at the axes J1 to J6 calculated from equation (1) are stored in the storage unit 17 linked with lines of the operating program.

Then, the lifetime $L10$ of the reduction gears (not shown) provided at the axes J1 to J6 of the robot 25 is calculated from the following equation (2) to equation (5).

$$T_m = \sqrt[10/3]{\frac{t_1 \cdot N_1 \cdot T_1^{10/3} + t_2 \cdot N_2 \cdot T_2^{10/3} + \ldots + t_n \cdot N_0 \cdot T_R^{10/3}}{t_1 \cdot N_1 + t_2 \cdot N_2 + \ldots + t_n \cdot N_n}} \quad (2)$$

$$N_m = \frac{t_1 \cdot N_1 + t_2 \cdot N_2 + \ldots + t_n \cdot N_n}{t_1 + t_2 + \ldots + t_n} \quad (3)$$

$$L_3 = 2000 \times \frac{N_0}{N_m} \times \left(\frac{T_0}{T_m}\right)^{\frac{10}{3}} \quad (4)$$

$$L_{10} = L_3 \times 3 \quad (5)$$

Here, $T_i$ ($1 \leq i \leq n$) expresses the load torque acting on each axis $J_i$ ($1 \leq i \leq n$). $N_i$ ($1 \leq i \leq n$) expresses the speed of each axis $J_i$. Further, the time $t_i$ ($1 \leq i \leq n$) is a predetermined unit time, for example, 8 msec, in the operating program. Note that in the embodiment shown in FIG. 1, n=6.

Further, $T_0$, $N_0$ are initial values of the load torque and speed, respectively. Furthermore, the lifetime $L_{10}$ expresses the time until 10% of the plurality of reduction gears can not longer be used when using a plurality of reduction gears under the same conditions.

Furthermore, the speed $N_i$ of each axis J1 to J6 is calculated from the position of each axis J1 to J6 calculated for each unit time at step 103. The calculated load torques, speeds, and reduction gear lifetimes are stored in the storage unit 17.

Figure 4A:
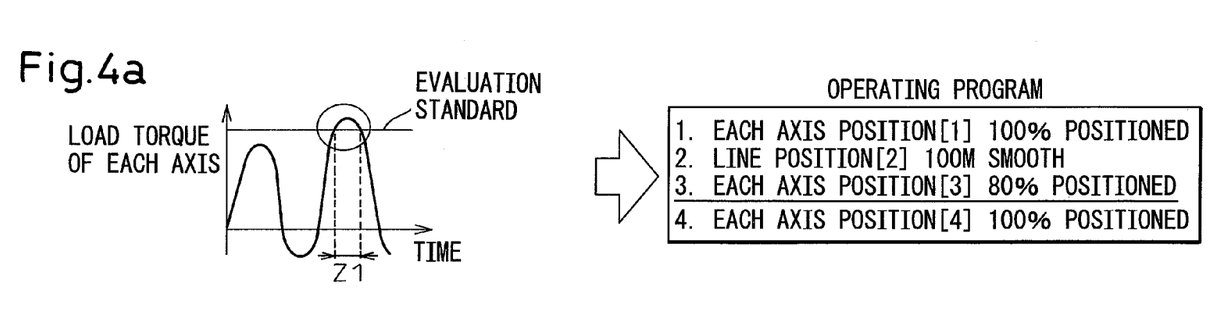
FIG. 4a is a view showing the relationship between time and the load torque of each axis.

Then, at step 105, the overload identifying means 12 identifies any operation in the operating program where the load torque, speed, and reduction gear lifetime exceed their evaluation standards. FIG. 4a is a view showing the relationship between the time and load torque of each axis. In FIG. 4a, the abscissa expresses the time, while the ordinate expresses the load torque of the axes. In FIG. 4a, the load torque $T_i$ is above the evaluation standard in a certain specific time zone Z1.

Then, the overload identifying means 12 identifies the line in the operating program corresponding to the time zone Z1 where the load torque $T_i$ exceeds the evaluation standard (see operating program for certain axis $J_i$ shown at right of FIG. 4a). Here, at line no. 3 of the program, when a certain axis moves to a position 3 (position [3]), it is assumed that the load torque $T_i$ of the axis exceeds the evaluation standard. This processing is performed for all of the axes J1 to J6. Due to this, the overload identifying means 12 identifies the axis on which overload acts and the line in the operating program when the overload acts.

The overload identifying means 12 similarly identifies the time zone where the speeds and reduction gear lifetimes of the axes J1 to J6 exceed their evaluation standards. By using the speeds and reduction gear lifetimes of the axes J1 to J6, it becomes possible to estimate the operation of the robot 25 by a high precision. However, for at least the load torque $T_i$, the axis where the evaluation standard is exceeded and the corresponding line in the operating program are identified.

Figure 5:
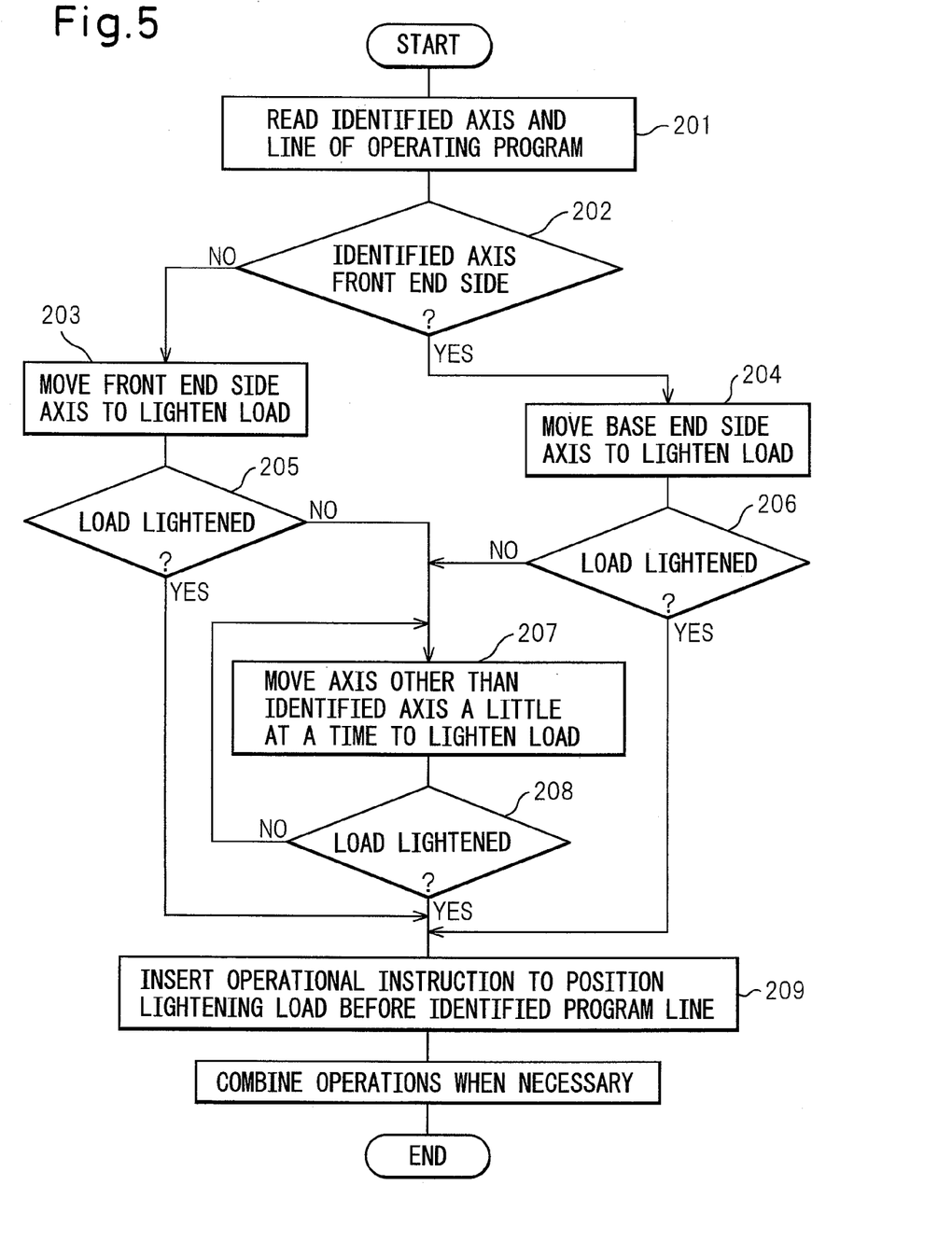
FIG. 5 is a view showing part of the flowchart shown in FIG. 2.

Then, at step 106, the operating program is improved. This step is specifically shown in the flowchart of FIG. 5. In FIG. 5, the explanation is given of the case where the load torque is excessive, but the same generally holds for the case of the speeds and reduction gear lifetimes of the axes J1 to J6.

At step 201 of FIG. 5, the axis J1 (i=1 to n) identified at step 105 of FIG. 2 and the line of the operating program are read out. Then, at step 202, it is judged if the identified axis $J_i$ is positioned at the front end side of the robot 25. Specifically, it is judged if $i \geq 5$.

When the identified axis $J_i$ is not the front end side axis, that is, when i<5, the routine proceeds to step 203. At step 203, an axis positioned at the front end side from the identified axis $J_i$ is moved to lighten the load of the identified axis $J_i$.

Figure 6:
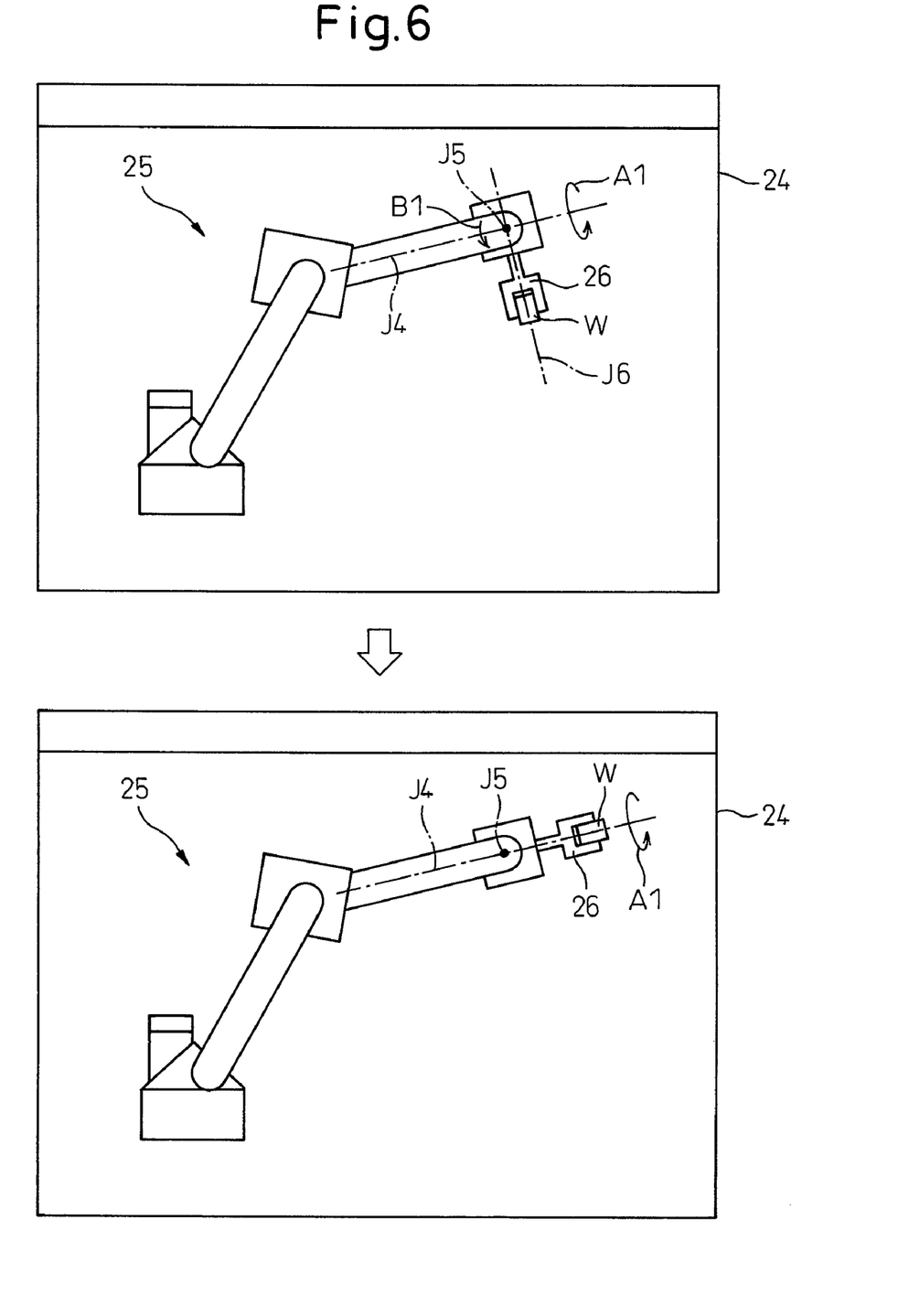
FIG. 6 is a view explaining a first example of making an axis positioned at a front end side from the identified axis move.

FIG. 6 is a view for explaining a first example for moving an axis positioned at the front end side from the identified axis. As shown in FIG. 6, when making the robot 25 rotate about the axis J4 (arrow A1), a load acts on the axis J4.

Figure 7A:
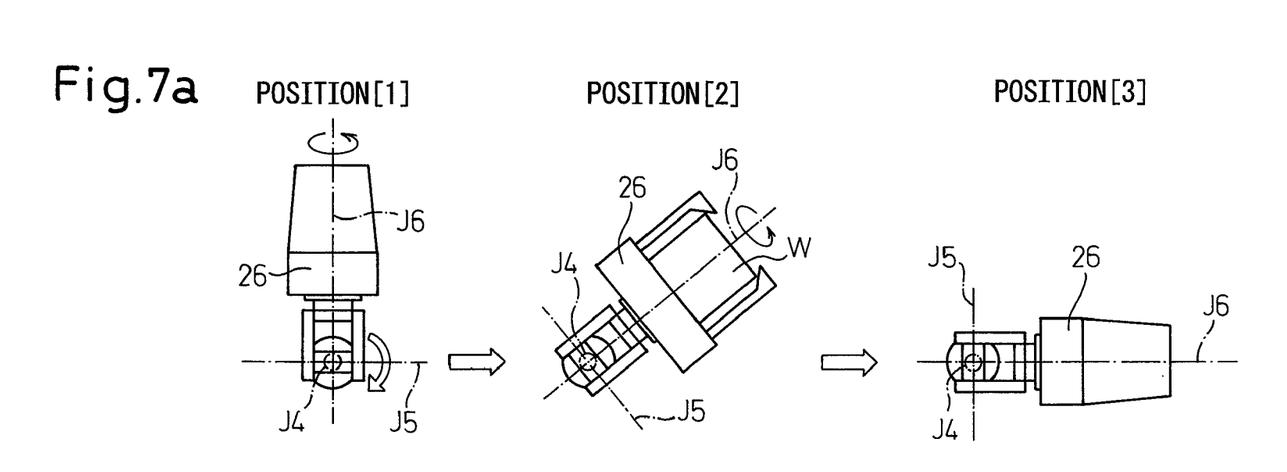
FIG. 7a is another view of a first example shown in FIG. 6.

FIG. 7a is another view of a first example shown in FIG. 6. As can be seen from FIG. 7a, when making the robot 25 rotate about the axis J4, it should be noted that in actuality the axis J6 also rotates about 180°.

Figure 7B:
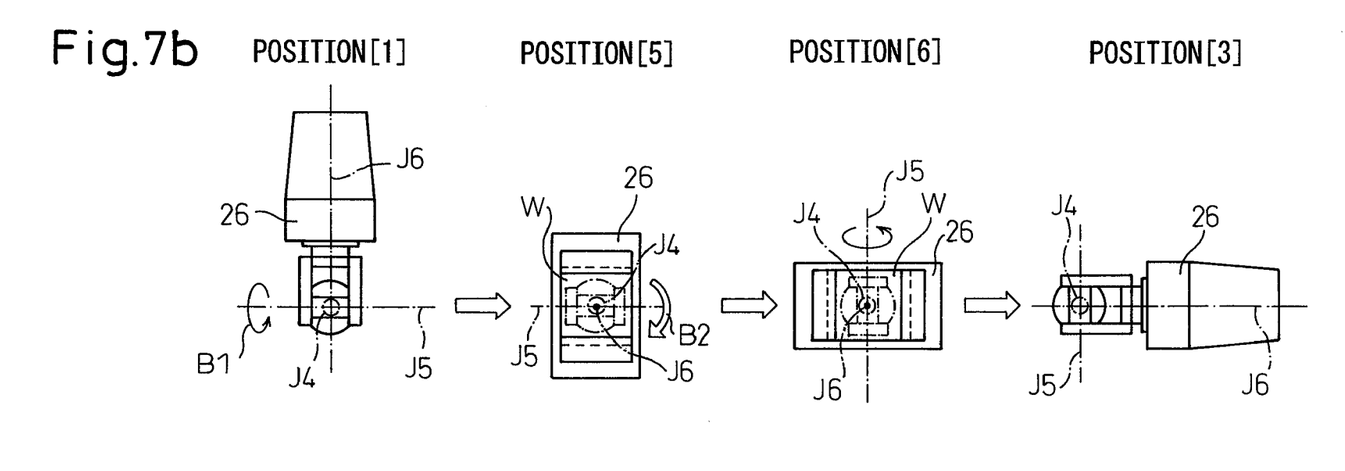
FIG. 7b is a view similar to FIG. 7a where the load is lightened.

In such a case, due to the additional operation generating means 13, an additional operation is generated making the axis J5 positioned at the front end side of the robot 25 from the axis J4 rotationally move in the direction of the arrow B1 of FIG. 6. Further, as shown by FIG. 7b, which is a view similar to FIG. 7a, an additional operation is simultaneously also generated making another axis J6 positioned at the front end side of the robot 25 from the axis J4 rotate in the direction of the arrow B2 of FIG. 7b (see rotational movement from position [5] to position [6] in FIG. 7b).

Due to this, as can be seen from FIG. 6, the center of gravity of the workpiece W is positioned on the extension of the center of rotation of the identified axis J4. In other words, in the case shown in FIG. 6 and FIG. 7, the axis J5 and axis J6 positioned at the front end side from the identified axis J4 are made to rotationally move in the arrow B1, B2 directions, respectively, so that the center of gravity of the workpiece W is positioned on the extension of the identified axis J4.

By such rotational movement, at least part of the load acting on the axis J4 is dispersed to the other axes J5, J6. For this reason, when making the robot 25 rotate about the axis J4 (arrow A1), the load acting on the axis J4 can be reduced.

Figure 10:
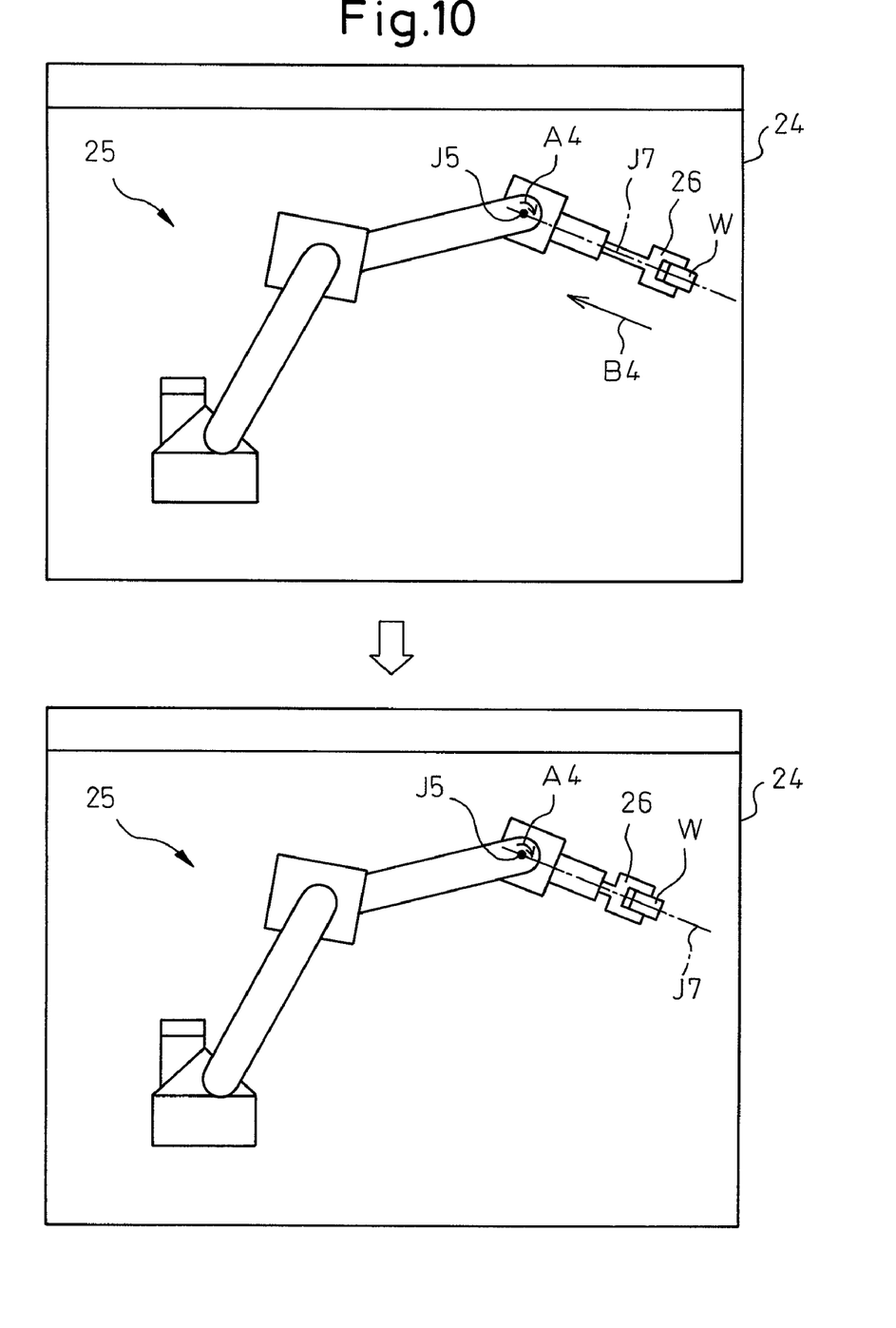
FIG. 10 is a view showing an example in the case of including a linear motion axis.

FIG. 10 is a view showing an example of the case of including a linear motion axis. In the robot 25 shown in FIG. 10, the axis J1 to axis J6 are the axes. Furthermore, the robot 25 includes the new axis J7 associated with the hand 26. The axis J7 is an axis of linear motion (below, "a linear motion axis"), while the hand 26 can move linearly along the axis J7.

In FIG. 10, when making the robot 25 rotate about the axis J5 (arrow A4), a load acts on the axis J5. In such a case, due to the additional operation generating means 13, an additional operation is generated making the hand 26 on the axis J7 positioned at the front end side of the robot 25 from the axis J5 linearly move toward the axis J5.

Due to this, as can be seen from FIG. 10, the horizontal direction distance between the center of rotation of the axis J5 and the center of gravity of the load, for example, the center of gravity of the workpiece, becomes shorter. Therefore, the load acting on the axis J5 can be reduced. For this reason, when a load acts on a certain axis, it will be understood that even if the axis positioned at the front end side of the robot from that axis is a regular axis or linear motion axis, the load acting on that axis is reduced.

Figure 8:
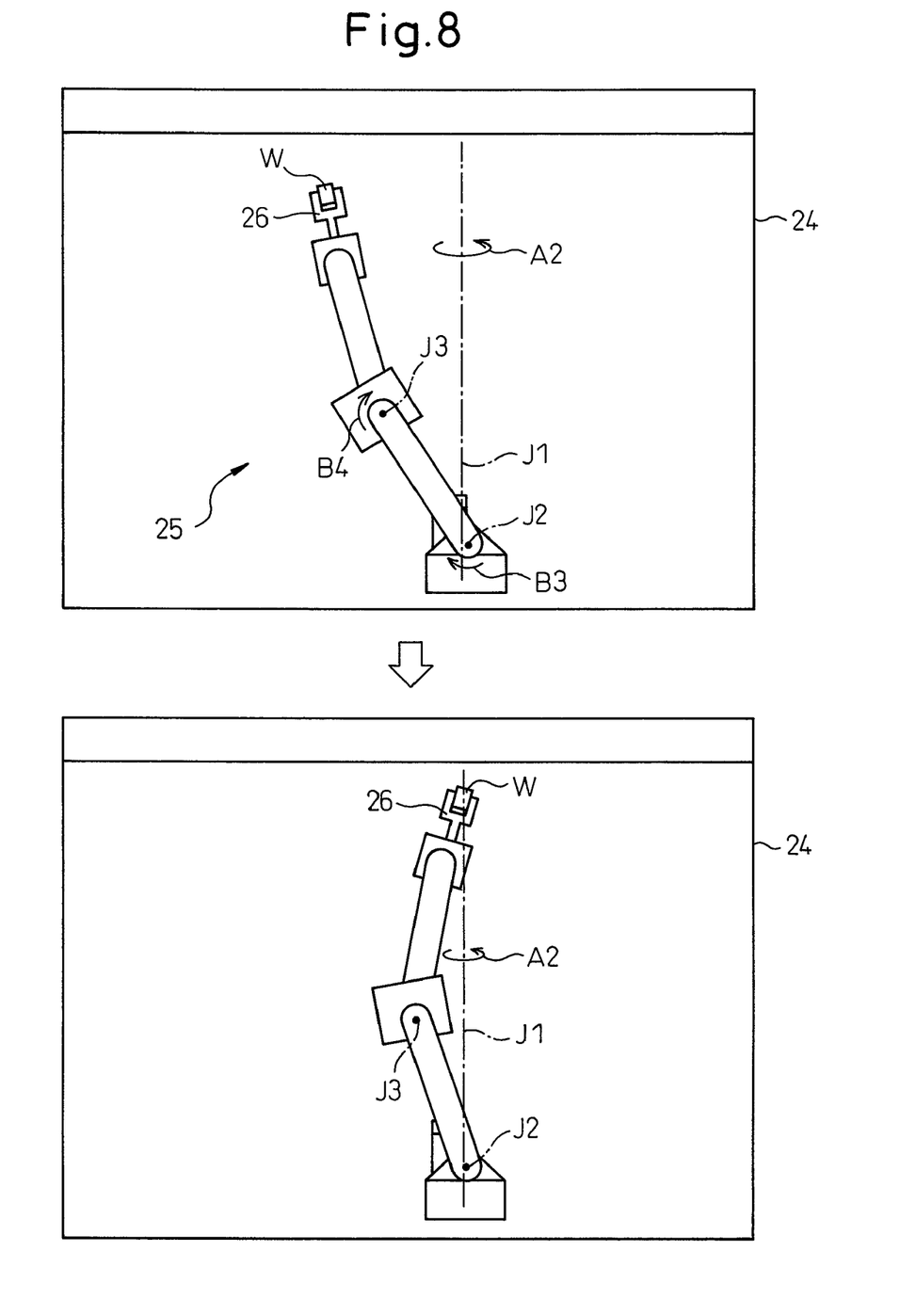
FIG. 8 is a view explaining a second example of making an axis positioned at a front end side from the identified axis move.

FIG. 8 is a view explaining a second example of making the axis positioned at the front end side from the identified axis move. In the case shown in FIG. 8, when making the robot 25 rotate about the axis J1 (arrow A2), a load acts on the axis J1.

In such a case, due to the additional operation generating means 13, an additional operation is generated making the axis J2 and axis J3 positioned at the front end side of the robot 25 from the axis J1 rotationally move in the arrow B3, B4 directions, respectively. Due to this, the center of gravity of the workpiece W is positioned on the extension of center of rotation of the identified axis J1.

By this rotational movement, at least part of the load acting on the axis J1 is dispersed to the other axis J2 and axis J3. Therefore, when making the robot 25 rotate about the axis J1

(arrow A2), the load acting on the axis J1 is reduced. In other words, in the case shown in FIG. 8, the axis J2 and the axis J3 positioned at the front end side from the identified axis J1 are made to rotationally move in the arrow B3, B4 directions, respectively, so that the center of gravity of the workpiece W is positioned on the extension of the identified axis J1.

Referring again to FIG. 5, at step 202, when the identified axis Ji is positioned at the front end side of the robot 25, in other words, when it is judged that $i \geqq 5$, the routine proceeds to step 204. At step 204, the axis positioned to the base end side from the identified axis Ji is made to move to lighten the load of the identified axis Ji.

Figure 9:
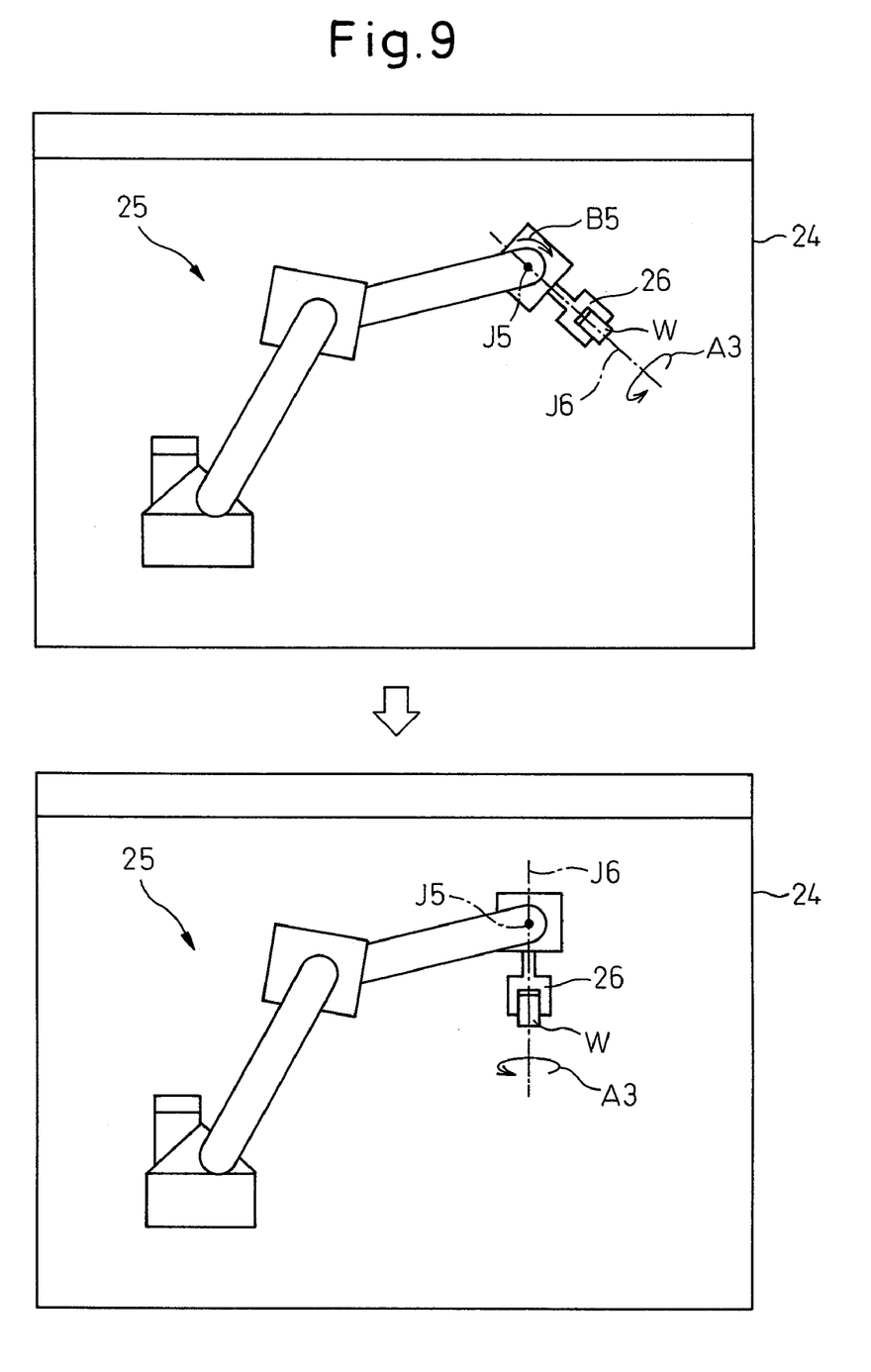
FIG. 9 is a view explaining an example of making an axis positioned at a base end side from the identified axis move.

FIG. 9 is a view for explaining an example of making axis positioned to the base end side from the identified axis move. In the case shown in FIG. 9, when the robot 25 is made to rotate about the axis J6 (arrow A3), a load acts on the axis J6.

In such a case, due to the additional operation generating means 13, an additional operation is generated making the axis J5 positioned at the base end side of the robot 25 from the axis J6 rotationally move in the arrow B5 direction. Due to this, the horizontal direction distance between the center of gravity of the workpiece W and the axis J5 becomes shorter or becomes zero.

By making the axis J5 move in this way, at least part of the load acting on the axis J6 is dispersed to the other axis J5. Therefore, when making the robot 25 rotate about the axis J6 (arrow A3), the load acting on the axis J6 is reduced. In other words, in the case shown in FIG. 9, the axis J5 positioned at the base end side from the identified axis J6 is made to rotate in the arrow B5 direction so that the horizontal direction component of the force acting on the identified axis J6 falls or is eliminated.

Referring again to FIG. 5, after making the front end side or base end side axis move at step 203 or 204, simulation is performed again at step 205 or 206. Further, it is judged if the load with respect to the identified axis Ji has been lightened.

When it is judged at step 205 or 206 that the load has been lightened, the routine proceeds to step 209. On the other hand, when it is judged that the load has not been lightened or the load has almost not been lightened, the routine proceeds to step 207. At step 207, the axes other than the identified axis Ji are made to rotationally move by just a predetermined fine amount.

The axis rotationally moved at step 207 is preferably different from the axis rotationally moved at steps 203, 204. Due to this, similar processing as performed at the steps 203 and 204 is avoided from being performed again.

For example, as explained with reference to FIG. 6, when making the axis J5 and/or axis J6 rotationally move at step 203, the axis J3 which still has not been rotationally moved and which is closest to the identified axis J4 is rotationally moved by exactly a predetermined fine amount.

Then, the routine proceeds to step 208 where a simulation is run again and it is judged if the load acting on the identified axis Ji has been lightened. Further, when it is judged at step 208 that the load has not been lightened, the routine returns to step 207. Further, the axis made to rotationally move at the previous step 207 is made to further rotationally move by exactly a predetermined fine amount or furthermore another axis is made to rotationally move by exactly a predetermined fine amount. After that, the routine proceeds again to step 208 where it is judged if the load has been lightened. The processing is repeated until it is judged that the load at the identified axis Ji has been lightened.

When it is judged that the load at the identified axis Ji is lightened, additional operational instructions of the other axes for lightening the load of the identified axis Ji are stored in the storage unit 17, then the routine proceeds to step 209. At step 209, the program adjusting means 15 inserts operational instructions of the other axes into an existing operating program.

Figure 4B:
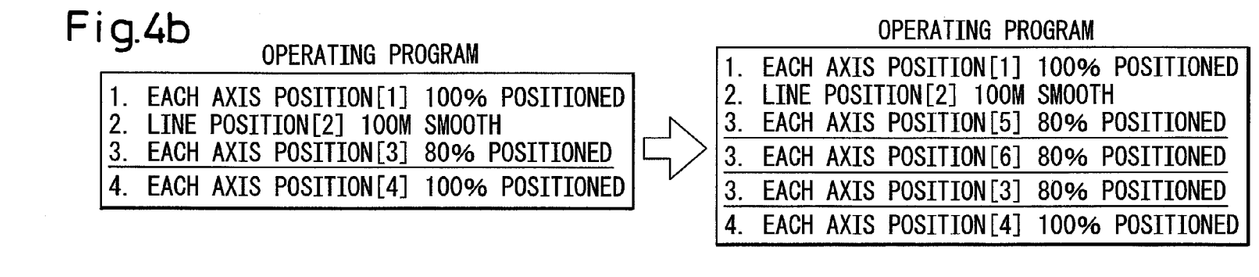
FIG. 4b is a first view of a robot operating program.

For example, as shown in FIG. 4b, in the case where a load acts when the identified axis J4 moves to the position 3 (position [3]), additional operational instructions (see FIG. 7b) are generated between the position [1] and position [3] for movement to the position [5] and position [6]. In such a case, as shown in FIG. 4b, the operational instruction to the position [5] and the operational instruction to the position [6] are inserted into the existing operating program.

Figure 4C:
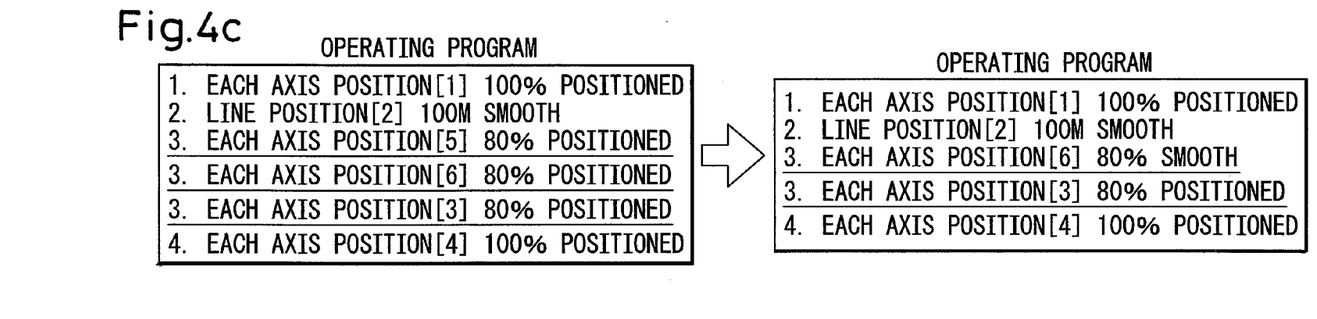
FIG. 4c is a second view of a robot operating program.

Then, at step 210 of FIG. 5, the operations are combined. As shown in FIG. 4c, when two or more operational instructions, for example, an operational instruction to the position [5] and an operational instruction to the position [6], are added, these may also be combined. For example, they are changed to an instruction for rotational motion about the axis J5 and movement to the position [6] without going through the position [5] in FIG. 7b. Due to this, it is possible to shorten the operating time of the robot 25. Furthermore, it is preferable to continuously and smoothly combine two or more operational instructions to prevent the operation of the robot 25 from being interrupted in the middle. Due to this, the operation time of the robot 25 can be further shortened.

On the contrary, when combining operations at step 210, the load acting on the identified axis Ji, for example, the axis J4, is not reduced that much. Therefore, this step 210 is not necessarily required. This is limited to the case where the operator gives priority to shortening the operating time of the robot 25.

Further, while not shown in FIG. 5, after the end of step 210, it is preferable to run a simulation again and use an interference checking means 14 to check if the robot 25 will interfere with other peripheral equipment using a 3D model on the display means 24. When found to interfere, the robot operating program can be readjusted to more suitably correct the operating program.

In this way, in the present invention, by the additional operation generating means 13 preparing additional operations for other axes, the load of the identified axis Ji can be dispersed to the other axes. Therefore, in the present invention, it becomes possible to lighten the load of the identified axis the load of which is large, without trial and error.

Furthermore, in the present invention, teaching and starting up a robot system able to simply improve the operation of the axis with a large load can be realized and as a result reduction of the work steps also becomes possible. Further, even when a problem occurs in the robot operation due to an overload, the cause can be examined and investigated and the robot operation can be easily improved.

Typical embodiments were used to explain the present invention, but it will be understood that a person skilled in the art could make the above changes and various other changes and deletions and additions without departing from the scope of the present invention.

The invention claimed is:

1. A robot program adjusting system, executed by a computer, for adjusting an operating program of a robot arm having a plurality of axes, the robot program adjusting system comprising:

an overload identifying device for successively reading operational instructions from said operating program of said robot arm to run simulations and thereby identify an axis where overload is acting from said plurality of axes;

an additional operation generating device for generating an additional operation for an axis positioned at a base end side from the axis identified by the overload identifying device when it is judged that the identified axis is positioned at the front end side of the robot arm and for an axis positioned at a front end side from the identified axis when it is judged that the identified axis is positioned at the base end side of the robot arm to lighten the load of said identified axis, wherein if the load at the identified axis is not reduced after generating the additional operation for the axis positioned at a base end side from the identified axis or the additional operation for the axis positioned at a front end side from the identified axis, the additional operation generating device further generates an additional operation for an axis which is not the identified axis, the axis positioned at a base end side from the identified axis nor the axis positioned at a front end side from the identified axis by a predetermined fine amount; and a program adjusting device for adjusting the operating program of said robot arm by simulation based on the additional operation generated by said additional operation generating device.

2. A robot program adjusting system as set forth in claim 1, wherein said axis other than the identified axis is positioned at a front end side of said robot arm from said identified axis.

3. A robot program adjusting system as set forth in claim 1, wherein said axis other than the identified axis is positioned at the base end side of said robot arm from said identified axis.

4. A robot program adjusting system as set forth in claim 1, wherein when two or more of said additional operations are generated, at least two of these additional operations are combined.

5. A robot program adjusting system as set forth in claim 2, wherein said additional operation includes making an axis positioned at a front end side of said robot arm from said identified axis move so that the center of gravity of the workpiece gripped by a hand of said robot arm is positioned on an extension of the center of rotation or movement direction of the identified axis.

6. A robot program adjusting system as set forth in claim 3, wherein said additional operation includes making an axis positioned at a front end side of said robot arm from said identified axis move so that a horizontal direction distance between a center of rotation or a movement direction of an axis of a base end side of said robot arm from said identified axis and a center of gravity of a workpiece gripped by a hand of said robot arm becomes the minimum.

7. A robot program adjusting system as set forth in claim 1, wherein said additional operation generating device includes an interference checking device for checking if said robot arm interferes with peripheral equipment based on the additional operation.

8. A robot program adjusting system as set forth in claim 2, wherein when two or more of said additional operations are generated, at least two of these additional operations are combined.

9. A robot program adjusting system as set forth in claim 3, wherein when two or more of said additional operations are generated, at least two of these additional operations are combined.

* * * * *